Nov. 12, 1957 — R. A. BOYD — 2,812,692
CONTROL OF DAYLIGHTING
Filed Nov. 1, 1954 — 5 Sheets-Sheet 1

INVENTOR
ROBERT A. BOYD

Nov. 12, 1957 R. A. BOYD 2,812,692
CONTROL OF DAYLIGHTING
Filed Nov. 1, 1954 5 Sheets-Sheet 2

INVENTOR
ROBERT A. BOYD
BY
ATTORNEYS

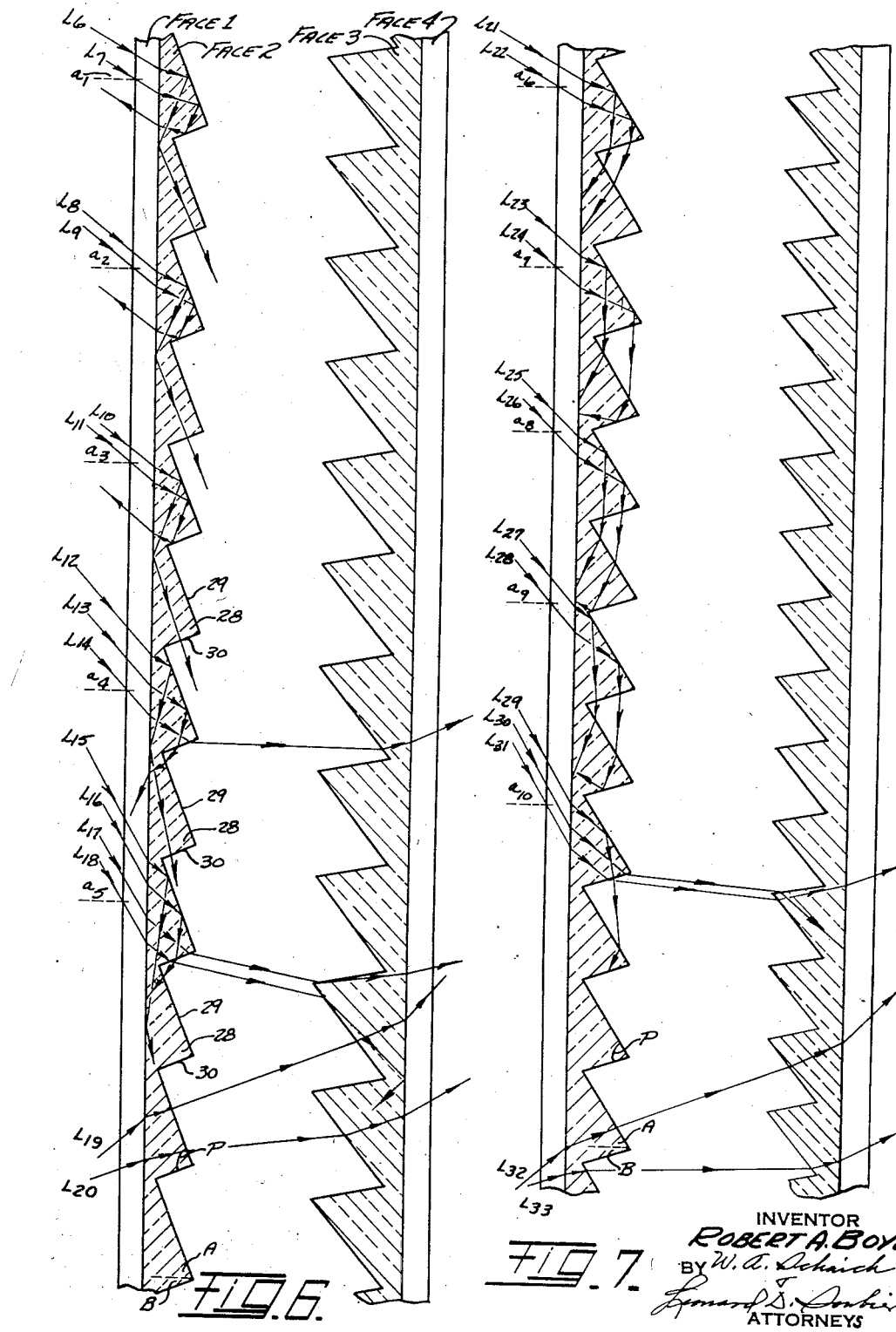

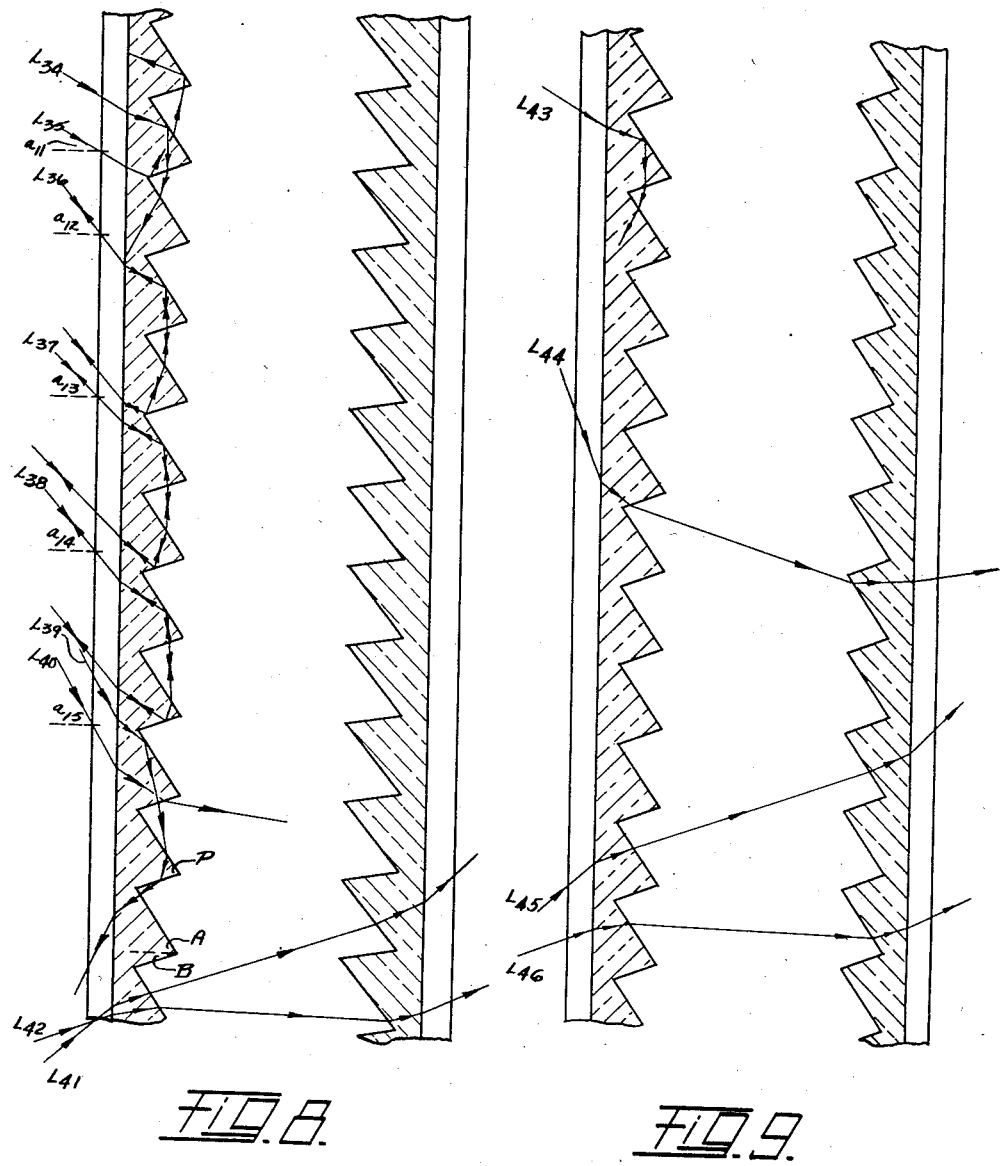

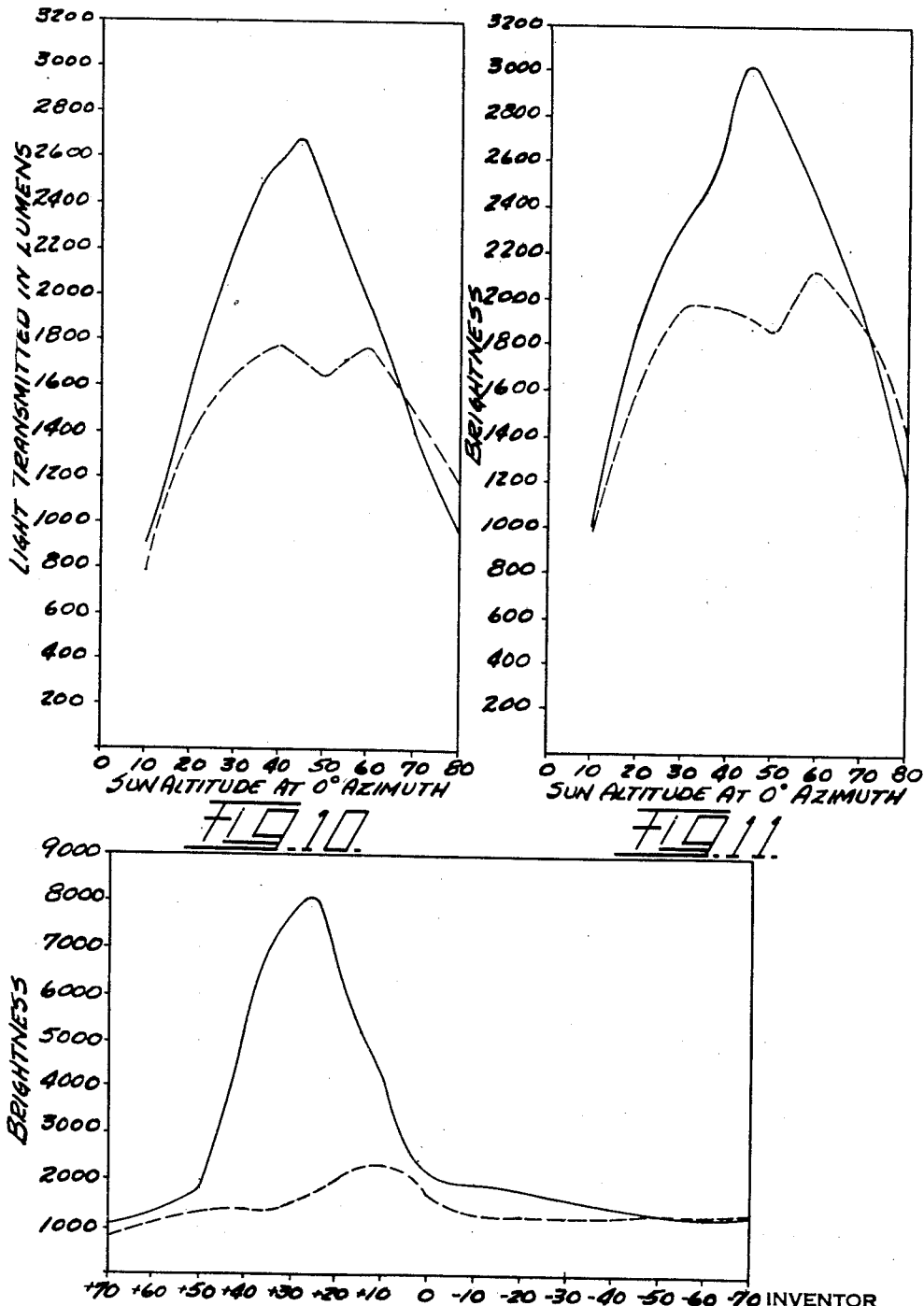

United States Patent Office 2,812,692
Patented Nov. 12, 1957

2,812,692

CONTROL OF DAYLIGHTING

Robert A. Boyd, Ann Arbor, Mich., assignor to Owens-Illinois Glass Company, a corporation of Ohio Application November 1, 1954, Serial No. 465,914

16 Claims. (Cl. 88—60)

This invention relates to the utilization of daylight for lighting the interior of buildings, and particularly to the construction of fenestration for lighting a room, such as a schoolroom, where a high quality of light is required.

In illuminating interiors it has been customary, up to recently, to consider only the level or amount of illumination. More recently, those skilled in the art have found that the quality of the lighting is also of great importance. Several requirements are now considered important for high quality lighting. First, the level of the illumination must be sufficiently high and not vary appreciably or to any great extent with various task locations in the room or with exterior illumination changes such as are encountered with the changing sun positions throughout the day or the seasons of the year. Second, the ratio of the brightness of fenestration to the brightness of the task (hereinafter referred to as brightness ratio) should be low. This is considered important in order that there are no great brightness contrasts in the room. Furthermore, the brightness ratio should not vary appreciably with different task locations and with exterior illumination changes throughout the day or the seasons of the year. Third, the brightness of the fenestration as viewed directly should be such that the average observer may view it without squinting or eye strain. In addition, the brightness should not vary greatly from various observer positions and from one portion of the fenestration to the other. These requirements should be fulfilled by any fenestration in order to produce a high quality of light in a room.

As disclosed and claimed in my copending application Serial No. 226,153, titled "Control of Daylighting," and filed May 14, 1951, now Patent No. 2,768,556, a high quality of light may be obtained from daylight by the use of a fenestration comprising a multiplicity of spaced parallel walls, such as are found in a multiplicity of glass blocks.

In the copending application, control of daylight is obtained by using four air-glass interfaces such as are present in a hollow glass block or in two spaced sheets of glass. In such a structure the interfaces are conventionally termed Faces 1, 2, 3 and 4—Face 1 being the exterior interface, Faces 2 and 3 being the inside interfaces, and Face 4 being the interface nearest the interior of the room. According to the copending application, Faces 1 and 4 are provided with vertical ribs having particular configurations, and Faces 2 and 3 are provided with horizontal prisms.

The configuration of the ribs on Face 1 is such that light from wide azimuth angles are refracted and internally reflected, and then transmitted to Face 2 at zero or small azimuth angles. This construction of the ribs on Face 1 provides a greater transmission of light and a more uniform illumination of Faces 2 and 3. In addition, this construction which is capable of utilizing light from wide azimuth angles, aids in maintaining the desired lighting conditions with exterior illumination changes throughout the day or the seasons of the year.

The horzontal prisms on Face 2 receive light from above the horizontal and direct the light in a generally horizontal direction. By the combined effect of Faces 1 and 2, the greater percentage of light approaches Face 3 in a direction substantially perpendicular to Face 3. The horizontal prisms on Face 3 receive the light from Face 2 and direct the light upwardly above the horizontal in directions toward the ceiling of the room.

The configuration of the vertical ribs on Face 4 is such that the light which approaches in directions at zero or small azimuth angles is diffused in azimuth directions in order to maintain more uniform conditions in the room and to lower the brightness of the faces. In addition, by the combined effect of Faces 3 and 4 receiving light in a substantially normal direction from Faces 1 and 2, the desirable lighting conditions are obtained. The level of the illumination is maintained and does not vary to any great extent with various task locations and with exterior illumination changes. The brightness ratio is reduced and does not vary appreciably with various task locations and with exterior illumination changes. By this structure set forth in my copending application, a very high quality of light is obtained.

It is an object of this invention to provide an improvement of said structure whereby the maximum brightness of the fenestration is reduced.

It is a further object of the invention to provide such a structure wherein the brightness variation due to changing external light conditions is reduced even more.

It is a further object of the invention to provide a structure whereby ground reflected light is utilized to light an interior.

Other objects of the invention will appear hereinafter.

Basically, the invention comprises providing a series of horizontal prisms on Face 2, each said prism having a configuration such that sunlight from low altitude angles is totally rejected by total internal reflection and sunlight from high altitude angles and light from the ground are transmitted by refraction through the prisms. In this manner the brightness due to the strong sunlight from low altitude angles is reduced by rejection of the light whereas the less strong sunlight from high altitude angles is transmitted. In addition, the amount of light transmitted from ground reflected light is increased, thereby providing more uniform light during varying light conditions.

Referring to the accompanying drawings:

Fig. 6 is a vertical cross-sectional view on an enlarged scale of the four air-glass interfaces, showing the path of light rays from varying altitude angles;

Fig. 7 is a vertical sectional view of a modification of the invention, showing the path of light rays from various altitude angles;

Fig. 8 is a vertical cross-sectional view of a further modification of the invention showing the path of light rays from various altitude angles;

Fig. 9 is a vertical cross-sectional view of a further modification of the invention showing the path of light rays from various altitude angles;

Fig. 10 is a curve of light transmitted at various altitude angles of the sun for fenestration structure with and without my invention;

Fig. 11 are curves of brightness at various altitude angles of the sun for fenestration structures with and without my invention; and Fig. 12 are curves of brightness versus observer altitude for fenestration structures with and without my invention.

Figure 1:
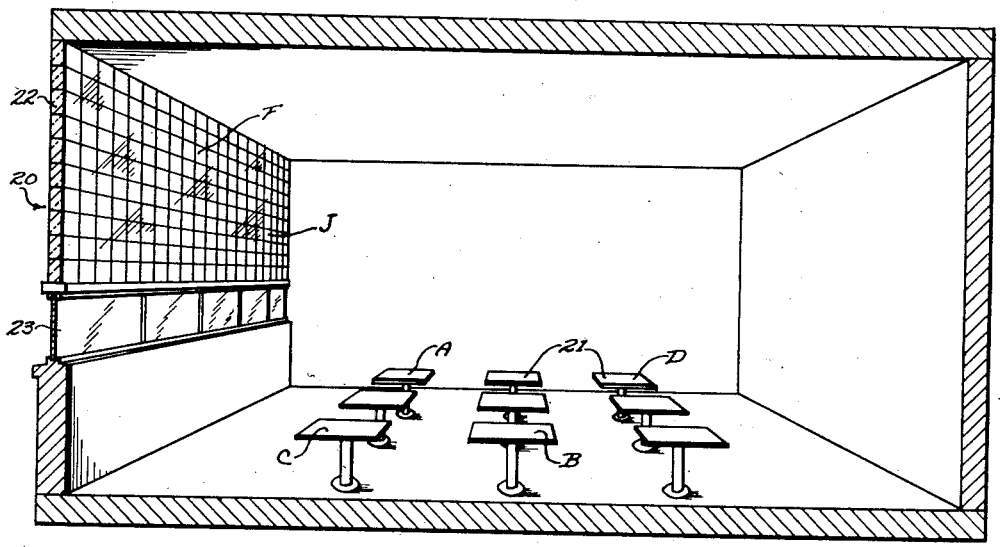
Fig. 1 is a perspective view of a room including a fenestration embodying my invention.
Figure 2:
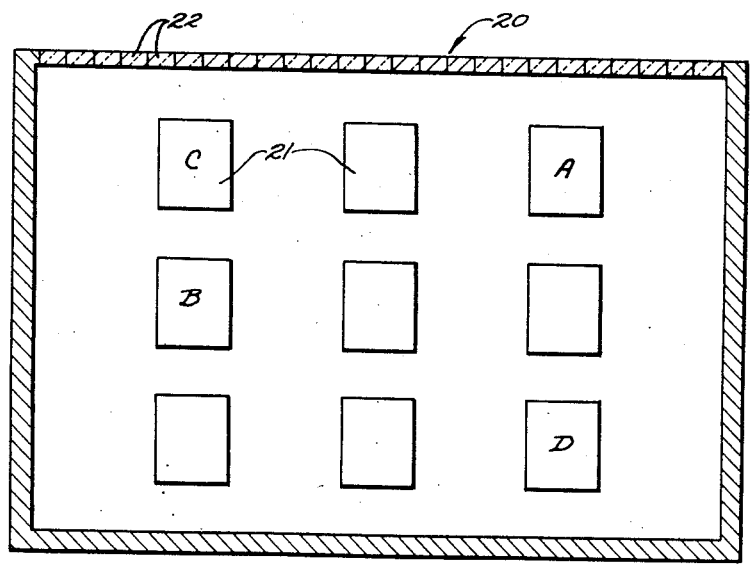
Fig. 2 is a plan view of the room.

The desired lighting requirements may be illustrated by referring to a typical room. Referring to Figs. 1 and 2, the room is shown including a fenestration 20 on one wall and various task surfaces 21 throughout the room. The fenestration comprises a series of glass blocks 22 above a clear vision strip 23. As set forth previously, the illumination should not vary appreciably with various task locations in the room, for example, from task A to task B. In addition, the illumination should not vary greatly with exterior illumination changes such as light changes from zero azimuth to a wide azimuth angle or for overcast skies as are encountered at various times during the day or seasons of the year.

Furthermore, the brightness ratio between the fenestration 20 and the various task locations should be low. In addition, the brightness ratio should not vary appreciably with various task locations, for example, from C to D; or for exterior illumination changes during the day or the seasons.

The brightness of the fenestration 20 as viewed directly should be tolerable and comfortable to the view of the average observer and should not vary greatly for various task locations or for various portions of the fenestration. For example, the brightness of a point F on the fenestration should be substantially the same whether viewed from task locations A, B, C or D, and the brightness of point F on the fenestration should be substantially the same as the brightness at point J on the fenestration.

In addition, the change in brightness caused by changes in external light conditions should be reduced to a minimum in order that the same level of light may be maintained in the room. It is toward this latter objective that my invention is particularly directed.

Figures 4, 5:
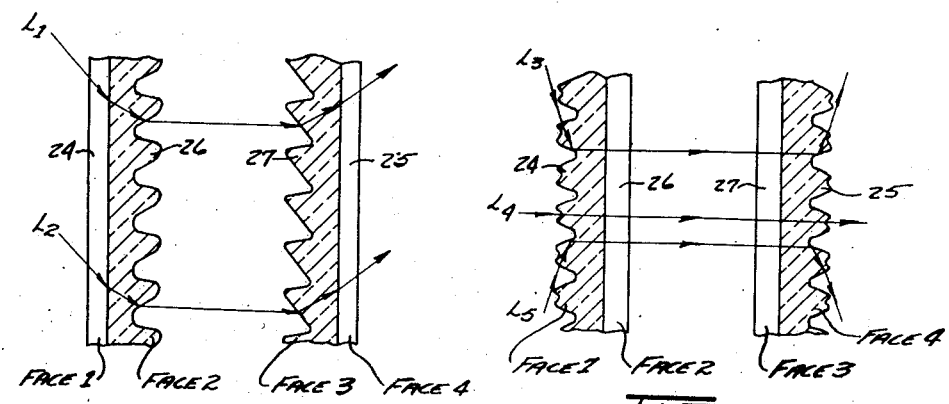
Fig. 4 is a vertical cross-sectional view of a fenestration structure comprising two sheets of glass and incorporating my invention.
Fig. 5 is a horizontal cross-sectional view of the same.

According to my aforementioned patent application, the desirable lighting conditions are attained by controlling the daylight by means of a fenestration comprising four airglass interfaces. As shown in Figs. 4 and 5, such interfaces are found in two spaced sheets of glass or in a hollow glass block. In such structures, the interfaces are conventionally referred to as Faces 1, 2, 3 and 4—Face 1 being the exterior interface, Faces 2 and 3 being the interior interfaces, and Face 4 being the interface nearest the interior of the room. According to my aforementioned patent application and as shown in Figs. 4 and 5, Faces 1 and 4 are provided with vertical ribs 24, 25 and Faces 2 and 3 are provided with horizontal prisms 26 and 27.

Referring to Fig. 4, the horizontal prisms are so constructed and arranged that sunlight from high altitude angles is redirected in a vertical plane toward the ceiling of the interior, as shown by light rays $L_1$ and $L_2$. Referring to Fig. 5, the prisms 24 and 25 are so constructed and arranged that light from wide azimuth angles is redirected toward the interior of the room and distributed within the interior.

Figure 3:
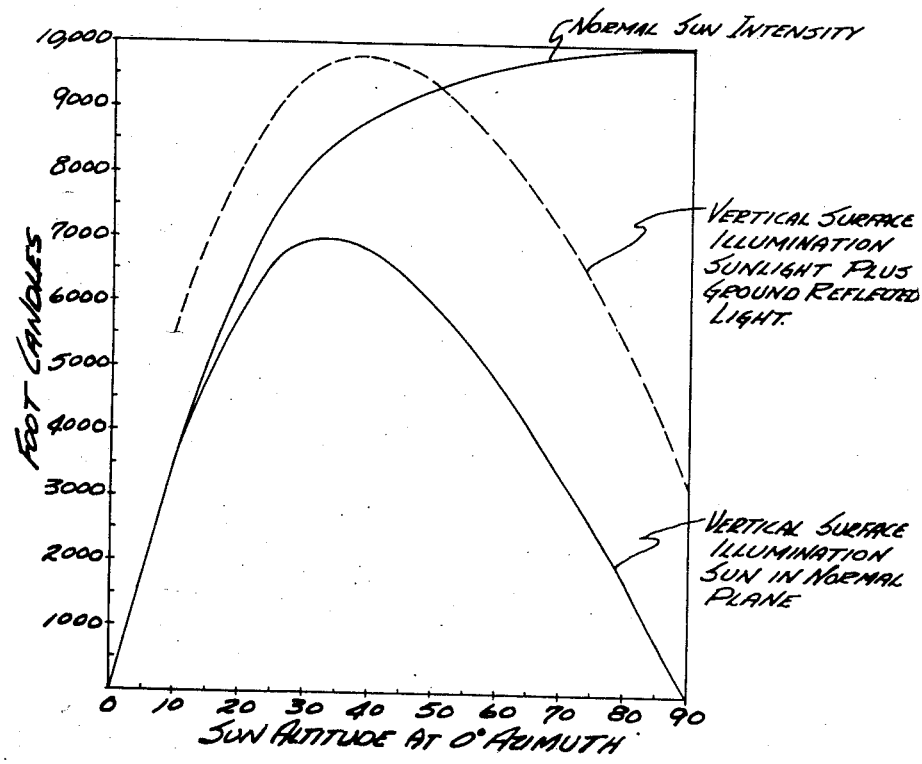
Fig. 3 is a curve of the varying light conditions due to various sun altitudes.

As shown in Fig. 3, a factor in lighting an interior by the use of daylight is that the sun intensity varies with sun altitude. The normal sun intensity increases with sun altitude while the maximum vertical surface illumination occurs when the sun is at about 30° altitude and 0° azimuth. As shown by the dotted curve the intensity of vertical surface illumination is increased approximately proportionately due to light reflected from the ground. It is apparent that if a proportionate amount of light is transmitted into the interior the amount of light transmitted and the brightness of the fenestration will vary greatly with sun altitude. This invention is particularly directed toward minimizing the changes in light transmitted and changes in brightness for varying sun altitudes.

According to the invention, this is achieved by forming prisms on Face 2 which are so constructed and arranged that sunlight from high altitude angles is rejected whereas sunlight from low altitude angles and light reflected from the ground are transmitted. I have found that the prism construction may be such that the light from the high sun altitudes is totally rejected in a single prism or a multiplicity of prisms.

According to one form of the invention shown in Fig. 6, Face 2 is provided with a multiplicity of prisms 28 having surfaces 29 and 30 forming an included angle P, the surface 29 forming an angle A with the horizontal of the surface 30 forming the angle B with the horizontal. In order that the rejection of sunlight may be accomplished by total reflection in a single prism, I have determined that the angle P is preferably 90°. The angle A is preferably 67° and the angle B is preferably 23°.

As shown in Fig. 6, by this construction light ray $L_6$ is partially rejected and light ray $L_7$ is totally rejected, both light rays striking Face 1 at altitude angle $a_1$. Similarly, light rays $L_8$ and $L_9$ at increased altitude angle $a_2$ are partially or totally rejected; as are light rays $L_{10}$ and $L_{11}$ at greater altitude angle $a_3$.

However, as to light rays at even greater altitude angles $a_4$, light rays $L_{12}$ and $L_{13}$ are partially rejected and light ray $L_{14}$ is transmitted toward Face 3 and thereafter refracted to Face 4 and redirected upwardly toward the ceiling of the interior. Similarly, as to light rays at an even greater altitude angle $a_5$, light rays $L_{15}$, $L_{16}$ are partially rejected and light rays $L_{17}$ and $L_{18}$ are transmitted toward Face 3.

The aforementioned altitude angles represent the following specific values of altitude:

$$a_1 = 30°$$
$$a_2 = 35°$$
$$a_3 = 40°$$
$$a_4 = 50°$$
$$a_5 = 60°$$

It can thus be seen that a substantial rejection of sunlight is achieved in the area of sun altitude of approximate 30 to 40°, which as shown in Fig. 3 is the area of greatest sun intensity, whereas sunlight from very high altitude angles is transmitted toward the interior. By this construction the amount of light transmitted at varying sun altitudes is made more nearly uniform and in turn the brightness of the fenestration is prevented from varying greatly due to varying sun altitudes.

In addition, by this construction light reflected from the ground, such as may normally be reflected from the sun or an overcast sky, is transmitted toward Face 3 and in turn toward the interior. This is shown by light rays $L_{19}$ and $L_{20}$ in Fig. 6.

In order that the rejection may be accomplished in a single prism, the included angle P is preferably equal to 90° but may range between 82 and 98°.

The range of altitude angles through which rejection is accomplished may be shifted by changing the angles A and B. For example, by increasing the angle A, and descreasing the angle B proportionately, the zone of rejection may be shifted, thereby rejecting sun from greater altitude angles. By decreasing the angle A, and increasing the angle B proportionately, the zone of rejection of sunlight may be shifted to reject sunlight from even lower altitude angles.

The desired rejection of sunlight may also be achieved by rejection through a multiplicity of prisms. This may be preferred since the zone of rejection is increased thereby rejecting sunlight through a greater range of sun altitudes. A modification showing the rejection through a multiplicity of prisms is shown in Fig. 7 wherein the angle P is preferably equal to 75° and the angle A is equal to 57½° and the angle B is equal to 17½°.

Light rays from intermediate altitude angles $a_6$, $a_7$, $a_8$ and $a_9$ are substantially rejected by total reflection through two prisms whereas light rays from high altitude angles $a_{10}$ are transmitted. The light rays are represented as $L_{21}$ and $L_{22}$ at altitude angles $a_6$; light rays $L_{23}$ and $L_{24}$ at altitude angles $a_7$; light rays $L_{25}$ and $L_{26}$ at altitude angles $a_8$; light rays $L_{27}$ and $L_{28}$ at altitude angles $a_9$; light rays $L_{29}$, $L_{30}$ and $L_{31}$ at altitude angles $a_{10}$. In addition, light reflected from the ground is represented as $L_{32}$ and $L_{33}$ and is transmitted toward the interior.

The aforementioned altitude angles represent the following specific values of altitude:

$$a_6 = 30°$$
$$a_7 = 40°$$
$$a_8 = 45°$$
$$a_9 = 50°$$
$$a_{10} = 60°$$

A further modification utilizing the rejection through a multiplicity of prisms is shown in Fig. 8 wherein the angle P is preferably equal to 75° and the angles A and B are changed in order to change the zone of rejection; the angle A being equal to 55° and the angle B being equal to 20°.

Light rays from intermediate altitude angles $a_{11}$, $a_{12}$, $a_{13}$ and $a_{14}$ are substantially rejected whereas light rays from high altitude angles $a_{15}$ are transmitted. The light rays are represented as $L_{34}$ and $L_{35}$ at altitude angles $a_{11}$; light ray $L_{36}$ at altitude angle $a_{12}$; light ray $L_{37}$ at altitude angle $a_{13}$; light ray $L_{38}$ at altitude angle $a_{14}$; light rays $L_{39}$ and $L_{40}$ at altitude angle $a_{15}$. In addition, light reflected from the ground is represented as $L_{41}$ and $L_{42}$, and is transmitted toward the interior.

The aforementioned altitude angles represent the following specific values of altitude:

$$a_{11} = 30°$$
$$a_{12} = 40°$$
$$a_{13} = 45°$$
$$a_{14} = 50°$$
$$a_{15} = 60°$$

In order that the rejection may be accomplished in two prisms, the included angle P is preferably equal to 75° but may range between 60 and 87°.

The performance of a glass block incorporating the invention, and particularly the structure shown in Fig. 8, is represented by the curves shown in Figs. 10, 11 and 12. The curves in the solid lines indicate the performance of a glass block such as that shown in Figs. 4 and 5, while the curves in the dotted lines indicate the performance of a glass block which incorporates the improved structure on Face 2.

The curves shown in Fig. 10 represent the light transmitted in lumens at various sun altitudes. It can be seen that the variation in light transmitted is not as great in a glass block embodying the invention (dotted line) as in a glass block of prior art type (solid line).

The curve in Fig. 10 represents the variation of brightness at various sun altitudes. It can be seen that the variation in brightness is not as great in a glass block embodying the invention (dotted line) as in a glass block of the prior art type (solid line). In addition, the degree of brightness is substantially reduced.

The curve in Fig. 11 represents the variation in brightness with variation in altitude. There is very little variation in brightness with varying altitude in a glass block embodying the invention (dotted line) as contrasted to a glass block which does not embody the invention (solid line).

I have found that a glass block or fenestration may be constructed by utilizing the same structures on Faces 3 and 4 as are used on Faces 1 and 2 and obtaining substantially the same performance. According to the modification shown in Fig. 9, the ribs on Face 4 are identical to the ribs on Face 1 and the prisms on Face 3 are identical with the prisms on Face 4. The wall on which Faces 3 and 4 is formed is inverted 180° with respect to the wall on which Faces 1 and 2 are formed. As shown in Fig. 9, a glass block or fenestration comprising such a structure functions in substantially the same manner as the previous forms of the invention, such as shown, for example, in Fig. 8. A light ray $L_{43}$ from an intermediate altitude angle is rejected whereas a light ray $L_{44}$ from a high altitude angle and light rays $L_{45}$, $L_{46}$ from ground reflected light are transmitted to the interior being lighted. In the structure shown in Fig. 9, the prisms on Faces 2 and 3 are identical to the prisms on Face 2 of Fig. 8.

The use of identical rib and prismatic structures on Faces 3 and 4, as on Faces 1 and 2, offers certain obvious advantages, particularly from the standpoint of savings in costs of molds and various other handling machinery.

It can thus be seen that a fenestration embodying the invention not only provides the features of azimuth correction and altitude correction, but also provides for rejection of the light from certain intermediate altitude angles and passage of the light reflected from the ground, thereby decreasing the maximum brightness of the panel and lessening the variation in brightness.

I claim:

1. In a structure for utilizing daylight to light an interior which comprises a vertical wall having an opening therein, and a block of light-transmitting material positioned in said opening, said block comprising two parallel spaced light-transmitting walls extending vertically in the opening, the light-transmitting wall nearest the daylight having its interior surface formed with a series of parallel prisms thereon extending in a generally horizontal direction, the second wall having its interior surface formed with a series of parallel prisms extending in a generally horizontal direction, each said prism on said second wall having a configuration such that light rays directed against said prism in substantially horizontal planes are redirected toward the outer surface of the second wall in directions lying in planes extending above the horizontal and forming acute angles with a horizontal plane, the improvement wherein each said prism on said first wall has surfaces forming an included angle ranging from 60 to 98°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altitude angles is substantially totally rejected by total internal reflection in said prisms on said first wall and sunlight from high altitude angles and light reflected from the ground are transmitted by refraction through said prisms in substantially horizontal directions.

2. The combination set forth in claim 1 wherein the configuration of the prisms on said second wall are substantially identical with the prisms on the first wall and are inverted 180° with respect to the prisms on the first wall.

3. In a structure for utilizing daylight to light an interior which comprises a vertical wall having an opening therein, and a block of light-transmitting material positioned in said opening, said block comprising two parallel spaced light-transmitting walls extending vertically in the opening, the first wall nearest the exterior having a series of parallel symmetrical ribs formed on its outer surface and extending vertically, each said rib having a configuration such that light rays striking said first wall at large azimuth angles are redirected by refraction and total internal reflection through the first wall to its interior surface in directions lying in substantially vertical planes, the light-transmitting wall nearest the daylight having its interior surface formed with a series of parallel prisms thereon extending in a generally horizontal direction, the second wall having its interior surface formed with a series of parallel prisms extending in a generally horizontal direction, each said prism on said second wall having a configuration such that light rays directed against said prism in substantially horizontal planes are redirected toward the outer surface of the second wall in directions lying in planes extending above the horizontal and forming acute angles with a horizontal plane, the second wall having parallel symmetrical ribs formed on the outer surface thereof, said ribs extending vertically, each said rib having a configuration such that light rays are directed by refraction and total internal reflection in directions lying in longitudinal planes at acute angles to the plane of said second wall, the improvement wherein each said prism on said first wall has surfaces forming an included angle ranging from 60 to 98°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altitude angles is substantially totally rejected by total internal reflection in said prisms on said first wall and sunlight from high altitude angles and light reflected from the ground are transmitted by refraction through said prisms in substantially horizontal directions.

4. In a structure for utilizing daylight to light an interior which comprises a vertical wall having an opening therein, and a block of light-transmitting material positioned in said opening, said block comprising two parallel spaced light-transmitting walls extending vertically in the opening, the light-transmitting wall nearest the day light having its interior surface formed with a series of parallel prisms thereon extending in a generally horizontal direction, the second wall having its interior surface formed with a series of parallel prisms extending in a generally horizontal direction, each said prism on said second wall having a configuration such that light rays directed against said prism in substantially horizontal planes are redirected toward the outer surface of the second wall in directions lying in planes extending above the horizontal and forming acute angles with a horizontal plane, the improvement wherein each said prism on said first wall has surfaces forming an included angle ranging from 60 to 87°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altitude angles is substantially totally rejected by total internal reflection in said prisms on said first wall and sunlight from high altitude angles and light reflected from the ground are transmitted by refraction through said prisms in substantially horizontal directions.

5. The combination set forth in claim 4 wherein the angle which one surface of each prism lying above said horizontal plane through the apex forms with said horizontal plane is approximately 55°.

6. The combination set forth in claim 4 wherein the configuration of the prisms on said second wall are substantially identical with the prisms on the first wall and are inverted 180° with respect to the prisms on the first wall.

7. In a structure for utilizing daylight to light an interior which comprises a vertical wall having an opening therein, and a block of light-transmitting material positioned in said opening, said block comprising two parallel spaced light-transmitting walls extending vertically in the opening, the light-transmitting wall nearest the daylight having its interior surface formed with a series of parallel prisms thereon extending in a generally horizontal direction, the second wall having its interior surface formed with a series of parallel prisms extending in a generally horizontal direction, each said prism on said second wall having a configuration such that light rays directed against said prism in substantially horizontal planes are redirected toward the outer surface of the second wall in directions lying in planes extending above the horizontal and forming acute angles with a horizontal plane, the improvement wherein each said prism on said first wall has surfaces forming an included angle of approximately 75°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altitude angles is substantially totally rejected by total internal reflection in said prisms on said first wall and sunlight from high altitude angles and light reflected from the ground are transmitted by refraction through said prisms in substantially horizontal directions.

8. The combination set forth in claim 7 wherein the angle which one surface of each prism lying above said horizontal plane through the apex forms with said horizontal plane is approximately 55°.

9. The combination set forth in claim 7 wherein the configuration of the prisms on said second wall are substantially identical with the prisms on the first wall and are inverted 180° with respect to the prisms on the first wall.

10. In a structure for utilizing daylight to light an interior which comprises a vertical wall having an opening therein, and a block of light-transmitting material positioned in said opening, said block comprising two parallel spaced light-transmitting walls extending vertically in the opening, the light-transmitting wall nearest the daylight having its interior surface formed with a series of parallel prisms thereon extending in a generally horizontal direction, the second wall having its interior surface formed with a series of parallel prisms extending in a generally horizontal direction, each said prism on said second wall having a configuration such that light rays directed against said prism in substantially horizontal planes are redirected toward the outer surface of the second wall in directions lying in planes extending above the horizontal and forming acute angles with a horizontal plane, the improvement wherein each said prism on said first wall has surfaces forming an included angle ranging from 82 to 98°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altitude angles is substantially totally rejected by total internal reflection in said prisms on said first wall and sunlight from high altitude angles and light reflected from the ground are transmitted by refraction through said prisms in substantially horizontal directions.

11. The combination set forth in claim 10 wherein the angle which one surface of each prism lying above said horizontal plane through the apex forms with said horizontal plane is approximately 67°.

12. The combination set forth in claim 10 wherein the configuration of the prisms on said second wall are substantially identical with the prisms on the first wall and are inverted 180° with respect to the prisms on the first wall.

13. In a structure for utilizing daylight to light an interior which comprises a vertical wall having an opening therein, and a block of light-transmitting material positioned in said opening, said block comprising two parallel spaced light-transmitting walls extending vertically in the opening, the light-transmitting wall nearest the daylight having its interior surface formed with a series of parallel prisms thereon extending in a generally horizontal direction, the second wall having its interior surface formed with a series of parallel prisms extending in a generally horizontal direction, each said prism on said second wall having a configuration such that light rays directed against said prism in substantially horizontal planes are redirected toward the outer surface of the second wall in directions lying in planes extending above the horizontal and forming acute angles with a horizontal plane, the improvement wherein each said prism on said first wall has surfaces forming an included angle of approximately 90°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altittude angles is substantially totally rejected by total internal reflection in said prisms on said first wall and sunlight from high altitude angles and light reflected from the ground are transmitted by refraction through said prisms in substantially horizontal directions.

14. The combination set forth in claim 13 wherein the angle which one surface of each prism lying above said horizontal plane through the apex forms with said horizontal plane is approximately 67°.

15. The combination set forth in claim 13 wherein the configuration of the prisms on said second wall are substantially identical with the prisms on the first wall and are inverted 180° with respect to the prisms on the first wall.

16. In a structure for utilizing daylight to light an interior, the combination comprising a vertical wall having an opening therein and a sheet of light-transmitting material positioned vertically in the opening, said sheet having its interior surface formed with a series of parallel prisms thereon extending in a generally horizontal direction, each said prism having surfaces forming an included angle ranging from 60 to 98°, one said surface of each prism on one side of a horizontal plane through the apex of each prism and lying above said horizontal plane forming a greater angle with said horizontal plane than the angle which another said surface of said prism on the other side of said horizontal plane and lying below said horizontal plane forms with said horizontal plane, such that sunlight from intermediate altitude angles is substantially totally rejected by total internal reflection in said prisms on said first wall and sunlight from high altitude angles and light reflected from the ground are transmitted by refraction through said prisms in substantially horizontal directions.

References Cited in the file of this patent

UNITED STATES PATENTS

| | | |
|---|---|---|
| 719,066 | Wadsworth | Jan. 27, 1903 |
| 720,386 | Wadsworth | Feb. 10, 1903 |
| 2,179,863 | Rolph | Nov. 14, 1939 |